Figure 1:
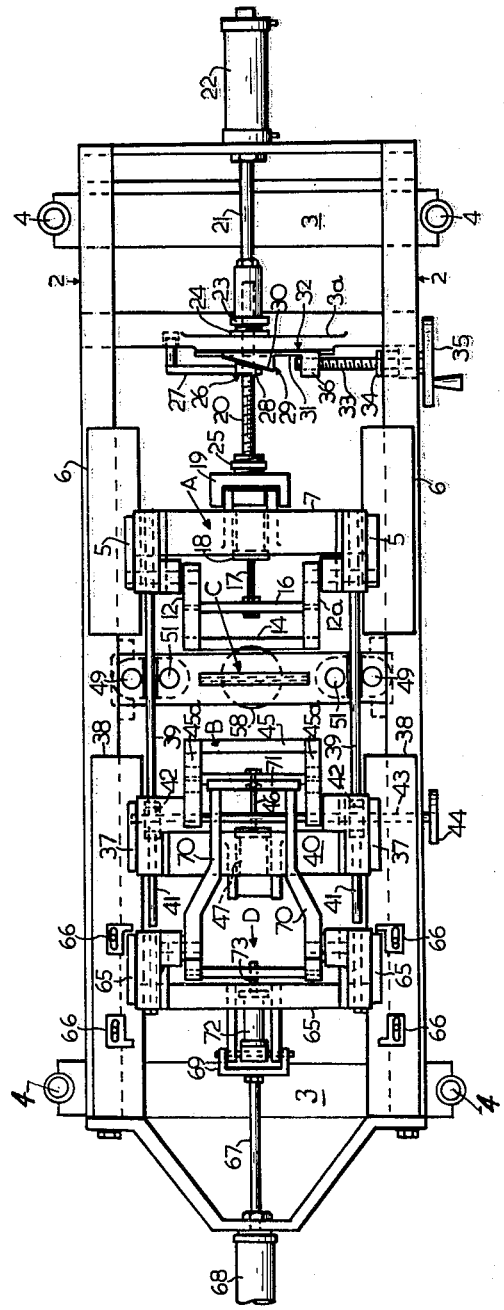

INVENTOR
HENRY M. HAYWARD

Nov. 3, 1964 H. M. HAYWARD 3,154,901
MACHINE FOR DIVIDING PLASTIC TUBES FILLED WITH
FLUID INTO VENDABLE CONTAINERS
Filed Aug. 2, 1962 3 Sheets-Sheet 2

INVENTOR
HENRY M. HAYWARD
By Emary L. Groff Jr.
ATTY

INVENTOR
HENRY M. HAYWARD

3,154,901

Patented Nov. 3, 1964

3,154,901
MACHINE FOR DIVIDING PLASTIC TUBES FILLED WITH FLUID INTO VENDABLE CONTAINERS
Henry Milton Hayward, 19 Euston Road, Rydalmere, near Sydney, New South Wales, Australia, assignor of one-half to Leslie Alfred Humphrey, Rydalmere, New South Wales, Australia
Filed Aug. 2, 1962, Ser. No. 214,315
Claims priority, application Australia, Aug. 7, 1961, 7,762/61
6 Claims. (Cl. 53—373)

Plastic tubes filled with fluid and divided transversely by a machine in a fusing operation into conjoined compartments to ultimately constitute vendable containers are known. After the compartments are formed and before they are severed through the fused parts into separate sealed containers, they are passed through a printing machine where particulars relating to the contents are printed on the individual containers.

In order to accurately locate the printing on the conjoined containers, it is essential for the containers to be of uniform length. In the case of containers made of certain plastic tube, for example P.V.C., it has been found that the tube stretches as it is moved through the fusing machine. The degree of stretch varies and wastage is caused as a result of the containers being irregular in length and thus failing to register correctly with the printing mechanism. For the same reason, i.e., irregularity in the length of the containers, it has not been found practicable heretofore to effectively print the tubes prior to filling so that the printed matter will be located accurately on the finished containers.

This invention has been devised to provide a machine for dividing plastic tubes filled with fluid transversely in a fusing operation whereby containers of substantially accurate length are obtained irrespective of variations in the stretching characteristics of plastic tubes. Consequently the filled conjoined containers can be maintained in accurate register with printing apparatus in a printing machine. Further owing to uniform length of the containers as achieved by the machine of this invention, the tubes can be printed prior to being filled and such printing will be in a designed position on the finished containers.

The machine consists of a base, at least two pairs of tube gripping jaws in adjustable spaced relationship thereon, means to intermittently reciprocate the jaws along the base together in a determined sequence, means to open and close the jaws; an electric tube fusing unit located between the two pairs of tube gripping jaws and means to move the same into and out of fusing engagement with a tube between the two pairs of tube gripping jaws and to actuate the electric apparatus; means to synchronise the several operations. Means may be incorporated to vary the travel of the tube gripping jaws and to hold a tube during the movement of the gripping jaws from one gripping position to another.

Figure 2:
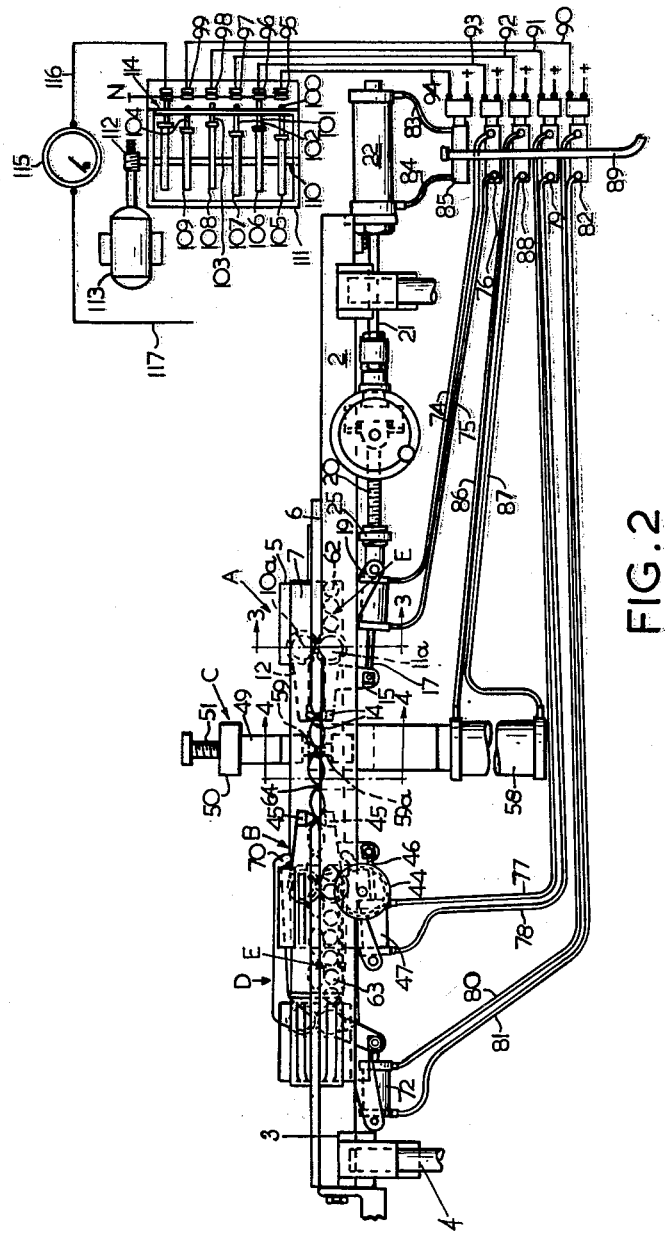
Figure 3:
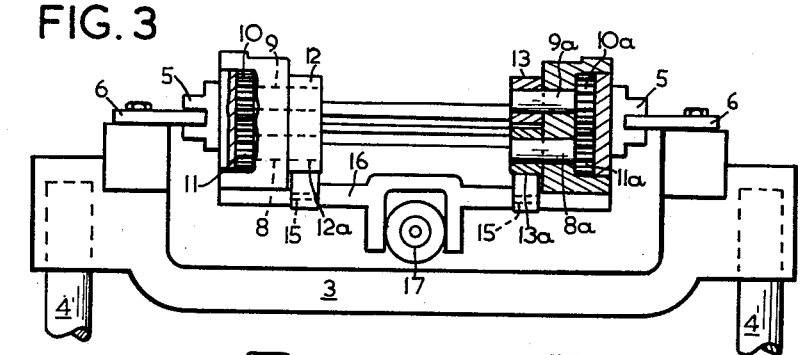
Figure 4:
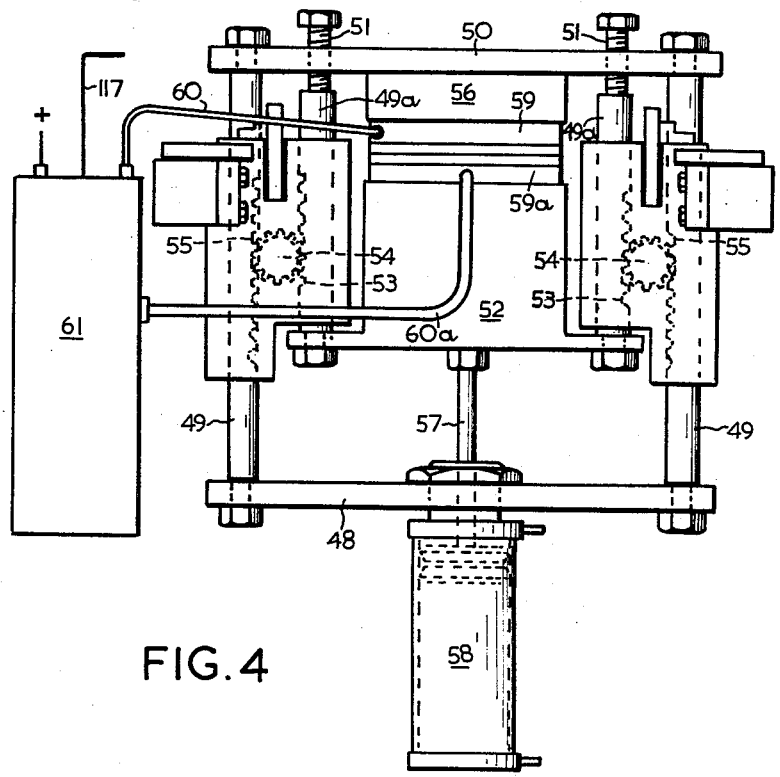

One embodiment of the invention is now described with reference to the annexed drawings wherein:

FIG. 1 is a plan view of the machine;
FIG. 2 is a side elevation;
FIGS. 3 and 4 are sections on lines 3—3 and 4—4 respectively of FIG. 2.

The machine consists of two bed members 2 mounted on transverse frames 3 supported on legs 4. Mounted on the bed members 2 are two pairs of tube gripping and transfer jaw units A and B; an electric tube fusing unit C between the jaw units A and B; a tube holding jaw unit D in juxtaposition to the jaw unit B and an arrangement of tube supporting rollers E mounted between the bed members 2.

The jaw unit A consists of a saddle 5 slidably mounted on plates 6 fixed to the bed members 2. A frame 7 on the saddle 5 has two pairs of journal pins 8–8a and 9–9a mounted in bearings transversely therein in parallel spaced relationship. The journal pins have interengaging gears 10–10a and 11–11a fixed thereto and pairs of jaw arms 12–12a and 13–13a are fixed to and project from the respective journal pins. Each pair jaw arms has a jaw 14 fixed to and between them and these jaws have a gap therein to permit a determined amount of fluid in a tube held thereby to pass therethrough. The jaw arms 12a and 13a each have a limb 15 thereon and these limbs are connected by bridge 16 to the plunger rod 17 of a plunger in a pneumatic cylinder 18 fixed to the frame 7. This plunger is actuated, in the manner to be explained, to open and close the jaws 14.

A crosshead 19 fixed to the frame 7 is connected by a rod 20 to plunger rod 21 of a plunger in a pneumatic cylinder 22 fixed to one of the frame members 3. This plunger is actuated, in a manner to be explained, to reciprocate the saddle 5. An adjustable stop 23 on the rod 20 will limit the travel of the saddle 5 in one direction by abutting a buffer 24 on a cross frame 3a fixed to the members 2. A second adjustable stop 25 will limit the travel of the saddle 5 in the other direction by abutting a block 26 mounted on an arm 27 longitudinally slidably mounted in the cross frame 3a.

This block 26 is bored to permit free sliding movement of the rod 20. The block 26 has a wedge face 28. A wedge block 29 which has a wedge face 30 in register with the wedge face 28, is slotted to travel across the rod 20. It is mounted on a slide bar 31 in slide guides 32 on the cross frame 3a. A spindle 33 mounted in a bearing 34 in one of the bed members 2 and provided with a hand wheel and handle 35 has a screwed stem entered into a nut block 36 on the slide bar 31. This adjusting wedge unit constitutes a simple means for minute adjustment of the position of a tube and particularly a pre-printed tube relative to the tube fusing unit.

The jaw unit B consists of a saddle 37 slidably mounted on plates 38 fixed to the bed members 2. This saddle 37 is connected by rods 39 to the saddle 5 of the jaw unit A and it is reciprocated in unison with the jaw unit A by the plunger-cylinder unit 22. A frame 40 is longitudinally adjustably slidably mounted on the saddle 37. This adjusting movement is accomplished by a rack 41 on the frame 40 engaging a pinion 42 on a shaft 43 mounted transversely in the saddle 37 and provided with a hand wheel 44. Means are incorporated to lock the hand wheel. The frame 40 has a jaw unit thereon which is identical to the jaw unit A with the exception that it has no gap to permit the escape of fluid. It faces the jaw unit A and is not here described in the same detail as the jaw unit A. However for the purpose of describing its operation it will be seen that the jaws 45 are mounted on arms 45a and actuated by the plunger rod 46 of a plunger in a pneumatic cylinder 47. The adjustment of the position of the jaws of unit B relative to the jaws of unit A enables the length of a container made by the fusing operation to be determined with practical accuracy.

The electric tube fusing unit C consists of a base frame 48 located between the jaw units A and B. Two posts 49 are fixed to the base frame 48 and top frame 50 is fixed to the top of the posts. A pair of buffer screws 51 are adjustably mounted in the top frame 50; they project downwardly in parallel spaced relationship to the posts 49 and constitute means for adjusting the operating clearance of the fuse bars (to be described). The bottom member 52 of the tube fusing unit is mounted on two posts 49a on which rack teeth 53 are formed. These teeth 53 are in engagement with loose pinions 54 which pinions also engage racks 55 on the posts 49 to open and close the fuse bars. The posts 49 are vertically slidably mounted in a casing 2a fixed to the bed members 2. The bottom member 52 is connected to the plunger rod 57 of a plunger in a pneumatic cylinder 58 fixed in the base frame 48. The arrangement of these parts is such that by reciprocating the plunger rod 57 the bottom member 52 and the upper member 56 move to and away from each other. Each has a fuse bar 59–59a respectively thereon and these bars are connected by flexible leads 60–60a to a high frequency generator 61.

Two series of conveyor rollers 62, 63(E) are mounted transversely in the machine to facilitate the passage of a tube. There is a gap between the two series in the proximity of the electric tube fusing unit to permit movement of the lower members of the jaws 14 and 15 and the tube fusing unit.

As shown in the drawings an additional tube holding jaw unit D is incorporated. When a tube is divided by a seam as indicated at 64, the seam tends to function as a hinge and thus permit the seamed part of the tube to sag during the movement of the jaw unit B from one gripping position to another. In order to overcome the problem created by this tendency of the tube to sag—particularly in the case of long containers—the jaw unit D is incorporated. It consists of a saddle 65 mounted on the plates 38 which are extended for this purpose. It may be mounted for fixed adjustment between the stops 66 to be adapted to the formation of containers of different lengths or it may be reciprocated by the rod 67 of a plunger in pneumatic cylinder 68 which rod is connected to the saddle 65 by crosshead 69. This unit has jaw arms 70 which are shaped to project through the unit B and its jaws 71 operate on the lead-out side of the jaws 45; they are actuated in the same manner as the jaws of unit A by interengaging gears, a plunger in pneumatic cylinder 72 and plunger rod 73.

The jaw actuating cylinder 18 of the unit A is connected by flexible pipes 74–75 to valve chamber 76; the jaw actuating cylinder 47 of the unit B is connected by flexible pipes 77–78 to valve chamber 79; the jaw actuating cylinder 72 of the unit D is connected by flexible pipes 80–81 to valve chamber 82; the cylinder 22 which reciprocates the units A and B is connected by pipes 83–84 to valve chamber 85, and the actuating cylinder 58 of the flushing unit C is connected by flexible pipes 86–87 to valve chamber 88. If a cylinder such as 68 is incorporated to reciprocate the unit D it is connected to a similar valve chamber (not shown). These valve chambers are connected to a pressurised air supply pipe 89. Each valve chamber has a port for each pipe connected thereto and a two way solenoid actuated air control valve therein which is a conventional unit. Electric leads 90 to 94 connect the respective solenoids to micro switches 95 to 99 for operation in an electric circuit and which are located in juxtaposition to plungers 100 to 104 which are actuated by timing cams 105 to 109 on a shaft 110 in a casing 111. This shaft is driven by a worm or like drive 112 from an electric motor 113. A further cam-plunger-micro switch unit 114 is arranged to actuate a timer unit 115 through lead 116 and the high frequency generator 61 through lead 117. The pressurised air supply and electricity supply units are conventional.

The sequence of operations of the machine is that a tube sealed at the end leading into the machine is filled with fluid. The trailing end is left open and is held above the machine to provide a head of fluid at the position where the tube is divided into compartments in the fusing operation and to permit the escape of excess fluid. The tube is placed in the machine to a position where the sealed end can be gripped by the jaw unit B. Pressurised air is supplied to the valve chambers 82 to 85 and the timing cam 105 to 109 and 114 set to start by operation of the shaft 110.

The jaw unit B grips the tube near the sealed end but at least a distance equal to the length of two containers away from the fusing unit C and the jaw unit A grips the tube a determined distance in front of the fusing position. The fusing unit C then grips the tube at the fusing position, forces fluid away from the inner surface of the tube at such position and after a timed interval the jams are heated by the high frequency unit and the meeting parts of the tube fused together. The width of the seam thus formed is sufficient to permit the tube to be subsequently severed through the seam without cutting the container. After the fusing operation, the high frequency circuit is opened but the bars 59–59a still hold the tube; then the jaw unit B opens and moves towards the fusing unit C a distance which is equal to the length of one container and again grips the tube at this position. Simultaneously the jaw unit A opens, moves away from the fusing unit C the same distance as the jaw unit B and again grips the tube. The fusing unit C then opens and the jaw units B and A draw the tube to the next seaming position and the next seaming operation is carried out. After the second seaming operation and for all subsequent operations, the jam unit B grips the tube at the position of a seam. The part of the tube in advance of the first seam made by the machine is regarded as waste. This can be avoided by attaching a dummy to the tube for the initial pull-through operations.

When a jaw unit D is incorporated it is timed to grip and hold a tube while the jaw units B and A move from one gripping position to the next. The jaw unit D then opens to permit the seamed tube to pass through it. Alternatively the jaw unit D may be reciprocated in timed sequence with the units B and A.

Once the advantages of holding a plastic tube on each side of a fusing device while such device is fusing a seam across the tube and then moving the tube by the holding means to the next fusing position is appreciated, variations in the construction and operation of the several components of the machine as herein described will be apparent to those skilled in the art to which the invention appertains. For example the gripping and transfer jaws may be mounted on pendulum units; an electronic adjusting unit may be substituted for the wedge adjusting means here described; the holding jaw unit D may be utilised to hold a tube during the transfer of the jaw units B and A from one gripping position to another and thus permit early retraction of the fusing device after a seam forming operation; pneumatic actuating means may be replaced by other actuating devices.

I claim:

1. Machine for dividing plastic tubes filled with fluid into vendable containers, said machine consisting of two bed members mounted on a base, two saddles longitudinally slidably mounted on plates fixed to the bed members, a frame on each saddle, two pairs of journal pins mounted on each frame said pairs of journal pins having interengaging gears thereon and pairs of arms fixed thereto, each pair of arms having a tube gripping jaw fixed to and between them, one jaw of each pair having a limb thereon and a bridge connected to each limb, a pneumatic cylinder fixed to each frame, a plunger in each cylinder having a plunger rod connected to the adjacent bridge, means to actuate the plungers to open and close the jaws and means to intermittently reciprocate the saddles along the plates; an electric fusing unit for fusing a seam across a tube held by the tube gripping jaws, said electric fusing unit being located between the two pairs of tube gripping jaws, means to move said electric tube fusing unit into and out of fusing engagement with a tube held by the two pairs of tube gripping jaws and to actuate the electric apparatus of said tube fusing unit, and means to synchronize the operations of the several parts.

2. Machine for dividing plastic tubes filled with fluid into vendable containers according to claim 1 including adjustable stops and buffers to limit the travel of the saddles.

3. Machine for dividing plastic tubes filled with fluid into vendable containers, said machine consisting of two bed members mounted on a base, two saddles longitudinally slidably mounted on plates fixed to the bed members, said saddles being connected together in spaced relationship by rods, a frame on each saddle, one of said frames being longitudinally slidably mounted on its saddle, said slidably mounted frame having a rack thereon in engagement with a pinion on a shaft mounted in its saddle, a hand wheel on said shaft and means to lock the hand wheel, one of said frames being connected to the plunger rod of a plunger in a pneumatic cylinder fixed to the base, two pairs of journal pins mounted on each frame, said pairs of journal pins having interengaging gears thereon and pairs of arms fixed thereto, each pair of arms having a tube gripping jaw fixed to and between them, one jaw of each pair having a limb thereon and a bridge connected to each limb, a pneumatic cylinder fixed to each frame, a plunger in each cylinder having a plunger rod connected to the adjacent bridge; means to actuate the plungers to open and close the jaws and means to intermittently reciprocate the saddles along the plates; an electric fusing unit for fusing a seam across a tube held by the tube gripping jaws, said electric fusing unit being located between the two pairs of tube gripping jaws, means to move said electric tube fusing unit into and out of fusing engagement with a tube held by the two pairs of tube gripping jaws and to actuate the electric apparatus of said tube fusing unit, and means to synchronize the operations of the several parts.

4. Machine for dividing plastic tubes filled with fluid into vendable containers according to claim 3 including adjustable stops and buffers to limit the travel of the saddles, one of said buffers being a block slidably supported in a frame and having a wedge face, a second block having a wedge face in register with the wedge face of the first block, said second block being mounted on a slide bar in guides in a cross frame, a spindle mounted in a bearing in the machine, said spindle having a screwed stem entered into a nut block on the slide bar and a hand wheel on the spindle.

5. Machine for dividing plastic tubes filled with fluid into vendable containers according to claim 3 wherein the electric tube fusing unit consists of a base frame, two posts fixed to the base frame and a top frame fixed to the posts, adjustable buffers projecting from the top frame, vertical slide guides on the machine in which said posts are mounted, a bottom member of the tube fusing unit having side racks in engagement with loose pinions, a top member of the tube fusing unit having parts slidably mounted on said posts, said posts having racks in engagement with said pinions, a pneumatic cylinder fixed to said base frame and having the rod of its plunger fixed to said bottom member, fuse bars on said bottom member and said top member and leads connecting said fuse bars to a high frequency generator.

6. Machine for dividing plastic tubes filled with fluid into vendable containers according to claim 3 wherein the tube gripping jaws are opened and closed and reciprocated and the electric tube fusing unit is opened and closed by pneumatic plungers in cylinders, each cylinder being connected by pipes to an independent valve chamber connected to a pressurized air supply, each valve chamber having a two-way solenoid actuated air control valve therein, electric leads connecting each solenoid to an independent micro-switch in an electric circuit, timing cams arranged to actuate said micro-switches in a determined sequence, said timing cams being on a shaft driven by an electric motor; a high frequency generator connected to the electric tube fusing unit and to a timer, said timer being connected by a lead to a micro-switch in the electric circuit, a timing cam on said shaft arranged to actuate said timer micro-switch.

References Cited by the Examiner
UNITED STATES PATENTS 3,061,989    11/62    Newell et al. _____ 53—182

FRANK E. BAILEY, *Primary Examiner.*

TRAVIS S. McGEHEE, *Examiner.*